(12) United States Patent
Kyriakopoulos et al.

(10) Patent No.: US 12,050,893 B2
(45) Date of Patent: Jul. 30, 2024

(54) COROUTINE SUSPENSION MECHANISM FOR IMPROVING PERFORMANCE OF A COMPUTER DEVICE

(71) Applicant: NVIDIA Corporation, Santa Clara, CA (US)

(72) Inventors: Konstantinos Kyriakopoulos, Weinsberg (DE); Michael F. Haidl, Stolberg (DE); Ralf Andreas Karrenberg, Offenbach am Main (DE); Zhiwei Cao, San Jose, CA (US); Gokul Ramaswamy Hirisave Chandra Shekhara, Karnataka (IN); Girish Bhaskarrao Bharambe, Mahārāshtra (IN); Justin Andrew Holewinski, Grove City, OH (US); Bharath Vasudevan, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 70 days.

(21) Appl. No.: 17/839,889

(22) Filed: Jun. 14, 2022

(65) Prior Publication Data

US 2023/0401044 A1    Dec. 14, 2023

(51) Int. Cl.
*G06F 8/41* (2018.01)
(52) U.S. Cl.
CPC .................................. *G06F 8/443* (2013.01)
(58) Field of Classification Search
CPC .............................. G06F 8/443; G06F 9/4484
See application file for complete search history.

(56) References Cited

U.S. PATENT DOCUMENTS

| | | | | |
|---|---|---|---|---|
| 8,051,426 B2* | 11/2011 | Meijer | ................ | G06F 9/45504 718/1 |
| 9,104,434 B2* | 8/2015 | Miadowicz | ........... | G06F 9/4552 |

(Continued)

OTHER PUBLICATIONS

Elizarov, Roman, et al. "Kotlin coroutines: design and implementation." Proceedings of the 2021 ACM SIGPLAN International Symposium on New Ideas, New Paradigms, and Reflections on Programming and Software. 2021. (Year: 2021).*

(Continued)

*Primary Examiner* — Matthew J Brophy
(74) *Attorney, Agent, or Firm* — Leydig, Voit & Mayer, Ltd.

(57) ABSTRACT

Systems and methods related to generating machine code using a coroutine suspension mechanism are disclosed below. An asynchronous programming model utilizing coroutines may be implemented in a compiler for a high-level programming language. The compiler is configured to include functionality related to an intrinsic function for a suspend operation of a coroutine. In accordance with an aspect of the disclosure, a method is disclosed for generating machine code that includes the coroutine mechanism. The method includes: receiving source code for a program in a high-level programming language, and compiling the source code with a compiler to generate machine code for a target processor. The source code includes a caller and a coroutine called by the caller. The compiler is configured to detect an intrinsic function for a suspend operation in the source code for the coroutine. The compiler inserts low-level code in the machine code in accordance with an ABI.

17 Claims, 9 Drawing Sheets

(56) References Cited

U.S. PATENT DOCUMENTS

| | | | |
|---|---|---|---|
| 10,747,511 B2* | 8/2020 | Radigan | G06F 8/443 |
| 11,663,012 B1* | 5/2023 | Seletskiy | G06F 11/3644 |
| | | | 712/214 |
| 2011/0167248 A1* | 7/2011 | Gafter | G06F 9/485 |
| | | | 712/E9.082 |
| 2012/0047495 A1* | 2/2012 | Meijer | G06F 8/314 |
| | | | 712/220 |
| 2015/0277881 A1* | 10/2015 | Strehovsky | G06F 8/4441 |
| | | | 717/154 |
| 2016/0321045 A1* | 11/2016 | Radigan | G06F 8/4484 |
| 2017/0116017 A1* | 4/2017 | Rose | G06F 9/45558 |
| 2017/0124166 A1* | 5/2017 | Thomas | H04L 69/08 |
| 2021/0294586 A1* | 9/2021 | Cimadamore | G06F 8/44 |

OTHER PUBLICATIONS

Dolan, Stephen, Servesh Muralidharan, and David Gregg. "Compiler support for lightweight context switching." ACM Transactions on Architecture and Code Optimization (TACO) 9.4 (2013): 1-25. (Year: 2013).*

* cited by examiner

COROUTINE SUSPENSION MECHANISM FOR IMPROVING PERFORMANCE OF A COMPUTER DEVICE

BACKGROUND

A coroutine refers to a generalization of a process or function that, when executed by a computer, can be suspended and later resumed. In addition to normal call and return functionality, a coroutine may also support suspend, resume, and destroy functionality. A suspend operation occurs within the body of the coroutine and, when executed, results in the execution being transferred back to the caller at the prior coroutine invocation site. A resume operation occurs in the caller and, when executed, transfers control back to the coroutine to resume execution right after the suspension point.

In order for the suspend and resume operations to work correctly, the state of the coroutine needs to be maintained while the coroutine is suspended and accessed when the coroutine is resumed. In other words, at least some data from the activation frame of the coroutine must be saved in a memory or registers. This data usually resides in memory and is referred to as a coroutine buffer. A destroy operation disposes of or deallocates the coroutine state saved in the coroutine buffer.

Coroutines extend the semantics of function or method calls in a high-level programming language like C++. In order to implement a coroutine, a compiler usually splits the coroutine into several state functions and then uses a state machine to guide the execution between different suspension points. However, implementing coroutines in this manner can create irregular control flow in the compiled program, which can be hard to analyze or optimize. Once a compiler has been used to generate low-level code for execution (e.g., machine code, assembly code, etc.), the program will typically not be optimized for efficient execution, which can reduce the efficiency of the process at execution. There is a need for addressing these issues and/or other issues associated with the prior art to improve the functioning of computer devices that execute programs using coroutine mechanisms.

SUMMARY

Embodiments of the present disclosure relate to computer systems configured to execute coroutines in program code. Program code for a target processor is generated by a compiler from source code in a high-level programming language. The source code may include an intrinsic function for a suspend operation, which is detected by the compiler during compilation and replaced with a number of instructions in accordance with an application binary interface.

In accordance with a first aspect of the present disclosure, a method is disclosed that includes: receiving source code for a program in a high-level programming language, and compiling the source code with a compiler to generate machine code for a target processor. The source code includes a caller and a coroutine called by the caller. The compiler is configured to detect an intrinsic function for a suspend operation in the source code for the coroutine.

In an embodiment of the first aspect, the intrinsic function for the suspend operation includes at least two parameters that include an offset value and a return value.

In an embodiment of the first aspect, the caller includes a resume operation that calls the coroutine at an offset location relative to a function pointer for the coroutine indicated by the offset value.

In an embodiment of the first aspect, the intrinsic function for the suspend operation is associated with an application binary interface that causes local resources in the coroutine to be stored in a coroutine buffer.

In an embodiment of the first aspect, the coroutine buffer is stored in one of a local stack memory or a heap memory.

In an embodiment of the first aspect, the compiler is further configured to detect an intrinsic function for a destroy operation in the source code that causes the target processor to deallocate the coroutine buffer for the coroutine.

In an embodiment of the first aspect, the method further includes: executing, by the target processor, the machine code such that the coroutine is suspended from a first suspend point and resumed at the first suspend point. In some embodiments, the target processor is same processor that compiles the source code to generate the machine code. In other embodiments, the target processor is a different processor from the processor that compiles the source code to generate the machine code. For example, the processor may be a host processor or central processing unit and the target processor may be a parallel processor or parallel processing unit.

In accordance with a second aspect of the present disclosure, a computer system is provided that includes a memory and a processor. The memory stores a compiler and a source code for a program in a high-level programming language. The processor is configured to execute the compiler to generate machine code for a target processor. The source code includes a caller and a coroutine called by the caller. The compiler is configured to detect an intrinsic function for a suspend operation in the source code for the coroutine.

In an embodiment of the second aspect, the intrinsic function for the suspend operation includes at least two parameters that include an offset value and a return value.

In an embodiment of the second aspect, the caller includes a resume operation that calls the coroutine at an offset location relative to a function pointer for the coroutine indicated by the offset value.

In an embodiment of the second aspect, the intrinsic function for the suspend operation is associated with an application binary interface that causes local resources in the coroutine to be stored in a coroutine buffer.

In an embodiment of the second aspect, the coroutine buffer is stored in one of a local stack memory or a heap memory.

In an embodiment of the second aspect, the compiler is further configured to detect an intrinsic function for a destroy operation in the source code that causes the target processor to deallocate the coroutine buffer for the coroutine.

In an embodiment of the second aspect, the target processor is further configured to execute the machine code such that the coroutine is suspended from a first suspend point and resumed at the first suspend point.

In an embodiment of the second aspect, the computer system further includes a parallel processing unit communicatively coupled to the processor and/or the memory.

In an embodiment of the second aspect, the parallel processing unit is the target processor and configured to execute the machine code such that the coroutine is suspended from a first suspend point and resumed at the first suspend point.

In accordance with a third aspect of the present disclosure, a non-transitory computer-readable medium is provided that stores instructions. Responsive to being executed by a processor, the instructions cause the processor to: receive source code for a program in a high-level programming language, and compile the source code with a compiler to generate machine code for a target processor. The source code includes a caller and a coroutine called by the caller. The compiler is configured to detect an intrinsic function for a suspend operation in the source code for the coroutine.

In an embodiment of the third aspect, the intrinsic function for the suspend operation includes at least two parameters that include an offset value and a return value.

In an embodiment of the third aspect, the caller includes a resume operation that calls the coroutine at an offset location relative to a function pointer for the coroutine indicated by the offset value.

In an embodiment of the third aspect, the target processor is further configured to execute the machine code such that the coroutine is suspended from a first suspend point and resumed at the first suspend point.

BRIEF DESCRIPTION OF THE DRAWINGS

The present systems and methods for implementing processes using a coroutine suspension mechanism are described in detail below with reference to the attached drawing figures.

DETAILED DESCRIPTION

Figure 1:
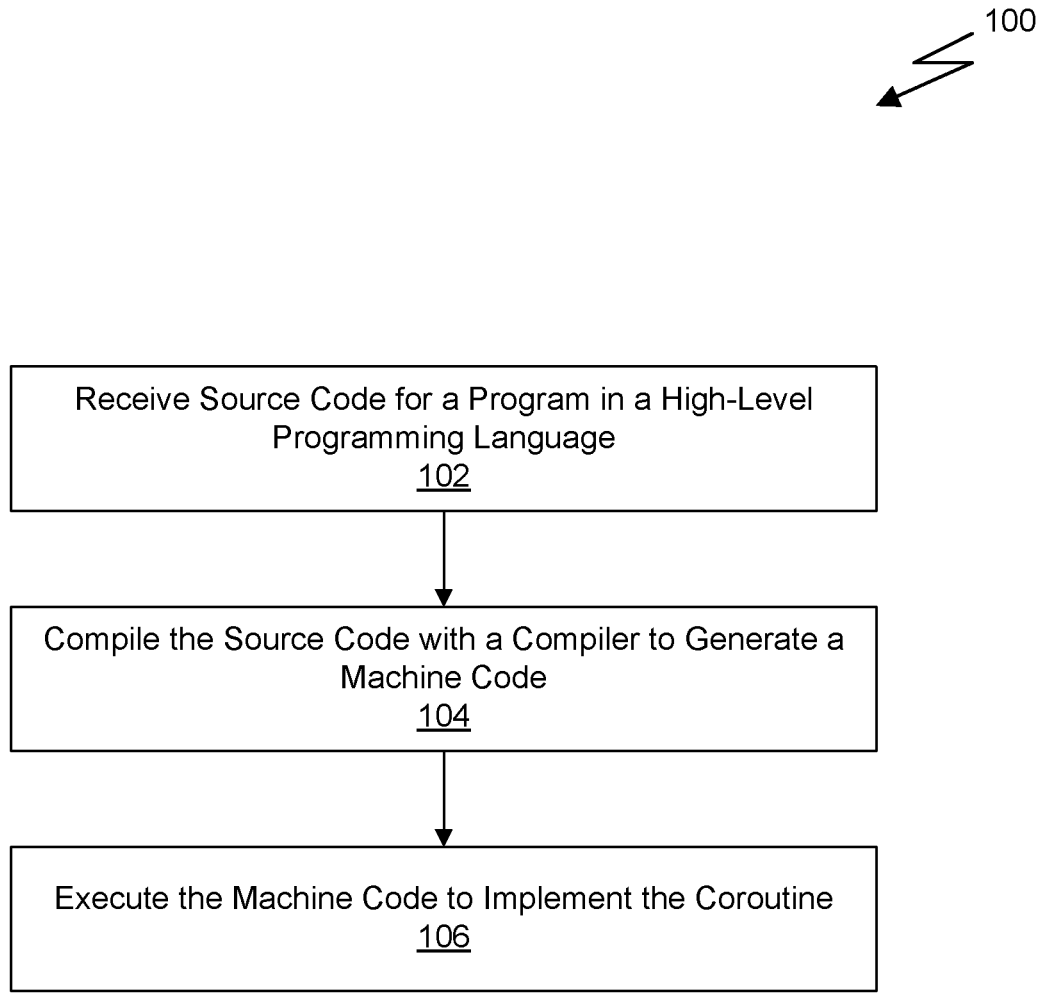
FIG. 1 illustrates a flowchart of a method for generating machine code using the coroutine suspension mechanism, in accordance with an embodiment.

Systems and methods related to generating machine code using a new coroutine suspension mechanism are disclosed below. The following describes an asynchronous programming model utilizing coroutines, which may be implemented in a compiler for a high-level programming language. The compiler may be configured to include functionality related to an intrinsic function for a suspend operation of a coroutine. An intrinsic function, as used herein, can refer to a name of a function in a high-level programming language that may be implemented directly by the compiler rather than included in a separate library implementation of the function.

Coroutines extend the semantics of a function or method call in a high-level programming language like C++. Consider the following C++ pseudo code as shown in Table 1.

TABLE 1

```
T coroutine(T p)
{
  T r0, r1;
  r1 = p;
  for( iter1 ) {
    r0 = foo(r1);
    if( cond1 ) {
      r1 = <SUSPEND>(r0);
      r1 = bench1(r1);
    } else {
      r1 = <SUSPEND>(r0);
      r1 = bench2(r1);
    }
  }
  return p;
}
void caller (T x)
{
  T r = coroutine(x);
  while (r != x) {
    r = bar(r);
    r = <RESUME>(coroutine(r));
  }
}
```

In the example of Table 1, there exists two routines: the caller function and the coroutine. Both the caller function and the coroutine execute concurrently and communicate back and forth while inside the corresponding "while" and "for" loops. The coroutine suspends its execution at the suspend points and returns control back to the caller, while the caller allows the coroutine execution to resume at the resume point. At the same time, data values are exchanged, such as indicated parameters r, r0, and/or r1. For the above execution pattern to work, there exists hidden machinery that controls the transfer of execution, the protocol of communication, and the preservation of state. These operations occur at specific points above, which are indicated by the meta-language constructs <SUSPEND> and <RESUME>. As used herein, concurrency can refer to either serial or parallel execution in one or multiple cores of a processor. Serial execution can refer to time division duplexing, where each function (e.g., caller, coroutine) executes for a number of cycles before execution is transferred to the other function, or context switching at the suspend points/resume points. Parallel execution can refer to the two functions (e.g., caller, coroutine) executing essentially simultaneously in two different cores. In parallel execution on multiple cores, a need may exist to insert barrier instructions and/or other synchronization mechanisms to control execution flow.

One conventional approach that may be used to implement the suspend and resume operations for coroutines is to insert a switch statement at the beginning of the coroutine to transfer execution to a different suspend point in the code based on the switch variable that is passed as an input parameter to the coroutine. As used herein, a suspend point can refer to a location in the coroutine where control may be transferred back to the caller function. Similarly, a resume point can refer to a location in the caller function where control is transferred back to the coroutine. Control is transferred to the appropriate resume point in the coroutine based on the resume state, such as by using a goto statement combined with a label located at the resume point. Table 2 shows an example of the coroutine functionality implemented using a switch statement.

TABLE 2

```
Pair<State, T> coroutine(State s, T p)
{
    switch (s) {
        case state_1: goto L1;   // Irregular control flow
        case state_2: goto L2;
        case state_e: error( );
        default:
    }
    T r0, r1;
    r1 = p;
    for( iter1 ) {
        r0 = foo(r1);
        if( cond1 ) {
            r1 = return Pair{state_1, r0};
            L1:
                r1 = bench1(r1);
        } else {
            r1 = return Pair{state_2, r0};
            L2:
                r1 = bench2(r1);
        }
    }
    return Pair{state_e, p};
}
void caller (T x)
{
    auto r = coroutine(state_0, x);
    while (r.second != x) {
        r.second = bar(r.second);
        r = coroutine(r.first, r.second);
    }
}
```

It will be appreciated that the pseudocode in Table 2 utilizes "iter1" and "cond1" as placeholders to define a number of iterations or a conditional statement for the for loop and if . . . else . . . statement. The switch statement uses state variable s to keep track of the state of the coroutine, where each case of variable s is associated with a different suspend and/or reentry point in the coroutine. During the initial invocation of the coroutine function by the caller function, an initial or null state is provided to the coroutine, which will have the effect of executing the default switch case clause and executing the coroutine from the top of the code immediately following the switch statement. However, whenever the coroutine executes a line of code that includes a return statement, this acts as a suspend point within the coroutine and a value of the state variable s associated with that suspend point is returned to the caller. By using the stored state variable the next time the coroutine is called, the switch statement will result in one of the goto statements being executed, which transfers program flow back to the previous suspend point.

Again, implementing coroutines in this manner can create irregular control flow in the compiled program, which can be hard to analyze or optimize due to the potentially large number of suspend points that can be implemented within the coroutine. Furthermore, existing compiler features used to improve efficiency in program flow in intermediate representations may not work well with this type of substitution. For example, irregular control flow can refer to creating loops with multiple entry edges (i.e., explicitly allowing entry into the for loop at multiple locations within the list of instructions included in one iteration of the loop). Compilers may have a difficult time dealing with irreducible control flow (e.g., such as using a technique referred to as "controlled node splitting"), possibly needing to duplicate parts of the code.

Another conventional approach used to implement coroutine functionality is to split the coroutine into multiple subroutines. Each state becomes a separate function and control is transferred into each independent state function after the caller resumes the coroutine. Table 3 shows an example of the coroutine functionality implemented using this approach.

TABLE 3

```
Pair<int, T> coroutine_entry(T p)
{
    if( iter1 ) {
        T r0 = foo(p);
        if( cond1 ) {
            return Pair{state_1, r0};
        } else {
            return Pair{state_2, r0};
        }
    }
    return Pair{state_e, p};
}
Pair<int, T> coroutine_state_1(T r1)
{
    r1 = bench1(r1);
    if( iter1 ) {
        T r0 = foo(r1);
        if ( cond1 ) {
            return Pair{state_1, r0};
        } else {
            return Pair{state_2, r0};
        }
    }
    return Pair{state_e, r1};
}
Pair<int, T> coroutine_state_2(T r1)
{
    r1 = bench2(r1);
    if( iter1 ) {
        T r0 = foo(r1);
        if ( cond1 ) {
            return Pair{state_1, r0};
        } else {
            return Pair{state_2, r0};
        }
    }
    return Pair{state_e, r1};
}
void caller (T x)
{
    Pair<int, T> (*coroutine_state[3])(T)) = {coroutine_state_1,
                                              coroutine_state_2,
                                              coroutine_state_error};
    auto r = coroutine_entry(x);
    while ( r.second != x ) {
        r.second = bar(r.second);
        r = (*coroutine_state[r.first])(r.second);
    }
}
```

The code shown in Table 3 is essentially the same implementation of the code implemented in Table 2 except the decision for the state transition occurs in the caller function instead of the coroutine function. Thus, the coroutine is now split into three separate functions representing coroutine entry, suspend point 1, and suspend point 2, and the caller function is configured to call the correct coroutine subfunction based on the state variable r.first using a lookup table and making function pointer calls.

This approach adds additional overhead to the control flow related to overhead associated with calling or returning from a function. This approach also results in irreducible control flow, code duplication between the different state subroutines, and also inhibits global analysis and optimization of the whole coroutine. Again, this is not ideal for producing optimal binary code for execution of the process.

In accordance with an aspect, a new approach for implementing coroutines within a high-level programming language can be implemented by introducing a new compiler intrinsic in order to implement the suspend operation for a coroutine. In this manner, the coroutine remains intact in the high-level programming language source code, maintaining the original control flow, all the way down to when the code has been translated into low level machine code. This mechanism enables suspension to occur at each suspend point, and the next time the coroutine is resumed from the caller, the control flow is automatically returned to the last suspend point. The compiler interprets these intrinsics for a suspend operation in the source code in a similar manner as an external application binary interface (ABI) call. There are, however, some differences that manifest during compiling (i.e., where the compiler generates the low level machine code from the source code in the high-level programing language). For example, the values that are live across the suspend point are saved in a special coroutine buffer stored in the memory. The code emitted before the suspend point is similar to an ABI function epilogue. Values returned back to the caller and the stack frame is unwound. The code emitted after the suspend point is similar to an ABI function prologue. New parameters are read into the coroutine and a new stack frame is created. From the perspective of the caller function, the resume operation is similar to an external ABI call via a function pointer. Code generation proceeds exactly as with any conventional pointer function call.

Utilizing the ABI to treat a suspend operation as an intrinsic that is treated slightly differently than a normal ABI call reduces the complexity of the control flow of the program. In other words, no complex or irregular control flow is introduced using the state machine transitions shown above with the switch statement or splitting the coroutine into multiple subroutines. Furthermore, no redundant calls to any utility functions are made, the code size is small without any replication, instruction cache locality is increased, and all compiler optimizations are available across the body of the function (including constant propagation, rematerialization, etc.) and can be very beneficial if they do not introduce live ranges across suspend points. Table 4 shows an example of the coroutine functionality implemented using this approach.

TABLE 4

```
Pair<int, T> coroutine(T p)
{
    T r0, r1;
    r1 = p;
    for( iter1 ) {
        r0 = foo(r1);
        if( cond1 ) {
            r1 = suspend(Pair{L1, r0});
            L1:
            r1 = bench1(r1);
        } else {
            r1 = suspend(Pair{L2, r0});
            L2:
            r1 = bench2(r1);
        }
    }
    return Pair{-1, p};
}
void caller (T x)
{
    auto r = coroutine(x);
    while ( r.second != x ) {
        r.second = bar(r.second);
        Pair<int, T> (*resume) (T) = (Pair<int, T>
```

TABLE 4-continued

```
        (*)(T))((char *)&coroutine + r.first);
        r = (*resume)(r.second);
    }
}
```

As shown in Table 4, the coroutine function includes two suspend points, which have been included in the code using a programming language intrinsic (i.e., 'suspend ( )'). In an embodiment, the intrinsic function for the suspend operation includes at least two parameters that include an offset value and one or more return values. The offset value (e.g., L1, L2) indicates a resume location associated with the suspend point and the return value(s) (e.g., r0, r1) indicate the current value(s) of the return variable(s) of the coroutine. In the resume operation, the caller adds the offset value (e.g., r.first) to the value of the pointer to the coroutine in order to specify a location within the coroutine where the function resumes execution. In other words, the caller uses the offset value returned to the caller by the suspend operation to define a new entry point into the coroutine. Because no other coroutine is invoked, the coroutine buffer can reside in the stack memory. The coroutine function will not be fully destroyed between suspensions of the coroutine, and the caller can handle the coroutine as if it were an alloca invocation (i.e., the size of the stack is modified upon return).

While the suspend function is an intrinsic implemented by the compiler, the resume variable is typecast as a function pointer having a similar type as the coroutine function but with a different entry point relative to the entry point of the coroutine function, based on adding the value of the offset value stored in r.first to the address of the coroutine function. Resuming the coroutine is then implemented in the caller function by calling the resume function pointer with the return value stored during the previous suspend operation (e.g., r.second). In other words, the caller includes a resume operation that calls the coroutine at an offset location relative to a function pointer for the coroutine indicated by the offset value. Furthermore, it will be apparent that the typecast operation must be executed each time a new suspend point is taken during the suspend operation prior to resuming the coroutine. This is done to ensure that the resume function pointer is directed to the correct entry location in the coroutine function corresponding to the most recent suspend point.

As shown above, the functions bar( ), foo( ), bench1( ), and bench2( ) are merely exemplary functions that can be used to modify values like any other function. These functions can take parameters and return values from within the coroutine, just like normal functions can call other functions. It will be appreciated that these functions are merely included to illustrate the example of a simple implementation of a coroutine, and that other structures, functions, or algorithms can be implemented in the coroutine.

FIG. 1 illustrates a flowchart of a method 100 for generating machine code using the coroutine suspension mechanism, in accordance with an embodiment. Each block of method 100, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few potential implementations. In addition, method 100 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 100 is within the scope and spirit of embodiments of the present disclosure.

At step 102, source code is received for a program in a high-level programming language. The source code includes a caller and a coroutine called by the caller, each of which may be implemented as functions in the high-level programming language. Alternatively, the caller and the coroutine may be referred to as a caller function or first function and a coroutine function or a second function. As used herein, the caller and/or coroutine may refer to a number of lines in the source code that, when compiled by a compiler, correspond to a number of instructions stored in a memory and that are executed by a processor or processors. The coroutine has the additional functionality of supporting suspend, resume, and destroy functionality for suspending execution of the coroutine at one or more suspend or resume points within the source code and resuming execution at a later point in time.

At step 104, the source code is compiled with a compiler to generate machine code. The compiler may refer to an application that, when executed by the processor, reads the lines of the source code to convert the source code into machine code capable of being executed by the processor. The machine code can refer to a binary executable that is configured for a particular target processor. Alternatively, the machine code can refer to an intermediate representation (IR) or assembly code, which can be further compiled into the binary executable for a target platform. In accordance with one aspect, the compiler is configured to detect an intrinsic function for a suspend operation in the source code for the coroutine (e.g., by parsing a token in the source code corresponding to the suspend operation). The compiler may implement the suspend operation by replacing the intrinsic function with a number of instructions in an intermediate representation or an assembly language. In an embodiment, the intermediate representation is LLVM intermediate representation (IR), which is a low-level programming language similar to an assembly language. It will be appreciated that the intrinsic function may not be defined in a separate and distinct library linked to the source code.

At step 106, the processor executes the machine code such that the coroutine is suspended from a first suspend point and resumed at the first suspend point. It will be appreciated that the functionality of the suspend and resume operations are implemented by way of controlling program flow using the program counter and a memory for storing program state information. The program state information associated with the coroutine can be stored in a stack memory or a heap memory.

In some embodiments, the machine code may be implemented for execution on a parallel processing unit that is communicatively coupled to the processor and/or the memory. In such cases, the processor may generate the machine code at step 104 and the parallel processing unit may execute the machine code 106 such that suspend and/or resume operations are implemented by the parallel processing unit within a memory space of the parallel processing unit, even though the compiler is executed by a host processor to generate the machine code for the parallel processing unit.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
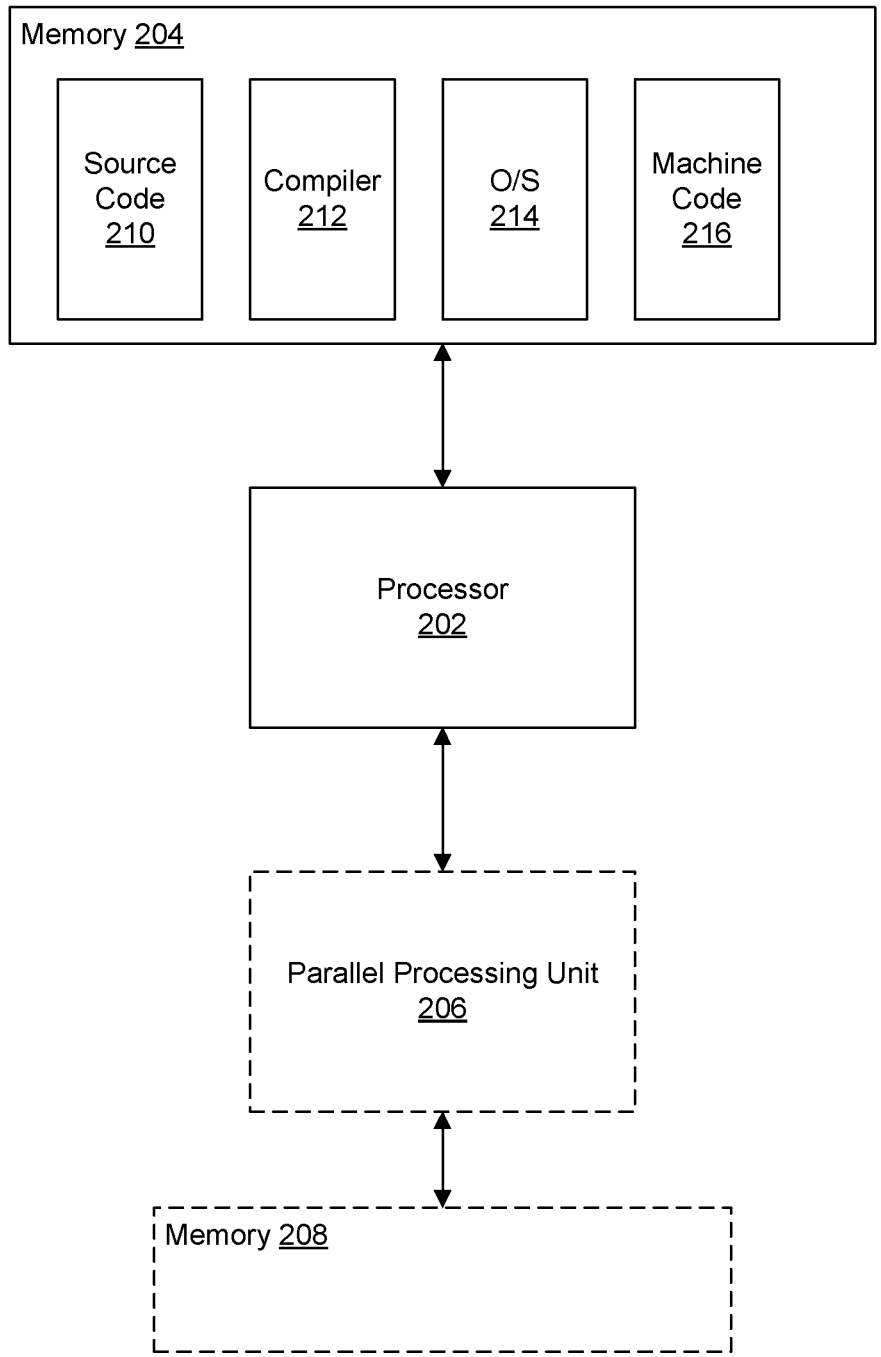
FIG. 2A illustrates a block diagram of an example system suitable for use in implementing some embodiments of the present disclosure.

FIG. 2A illustrates a block diagram of an example computer system 200 suitable for use in implementing some aspects of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the method 100 is within the scope and spirit of embodiments of the present disclosure.

As shown in FIG. 2A, the computer system 200 includes a host processor 202 communicatively coupled to a memory 204. The memory 204 stores applications and data including, but not limited to, a source code 210, a compiler 212, an operating system 214, machine code 216, and any other applications or data provided to execute the functionality described herein. The operating system 214 may be any operating system compatible with the system 200, including Microsoft® Windows, Apple® MacOS, Apple® iOS, Google® Android, or the like. The compiler 212 can be any compiler for a programming language suitable for implementing coroutines. In some embodiments, the compiler 212 is a single application that generates an intermediate representation (IR) from the source code 210. For example, the IR can be, e.g., a representation of the source code 210 in a register transfer language (RTL) or LLVM IR, which can make it easier for optimizations to be performed on the code. In other embodiments, compiler 212 can include a number of separate programs including, for example, a pre-processor, a compiler, an assembler, and a linker. These programs can process the source code sequentially, producing a number of intermediate representations of the source code before finally producing a binary executable machine code 216.

The programming language can include, but is not limited to, C++, C#, Java, Python, and the like. As used herein, the source code 210 can be related to the machine code 216 in that the machine code 216 is the result of compiling the source code 210 using the compiler 212.

In some embodiments, the system 200 also includes a parallel processing unit 206 such as a graphics processing unit (GPU), vector processing unit (VPU), tensor processing unit (TPU), or the like. In one embodiment, the parallel processing unit 206 is the PPU 400 of FIG. 4, described in more detail below.

Figure 2B:
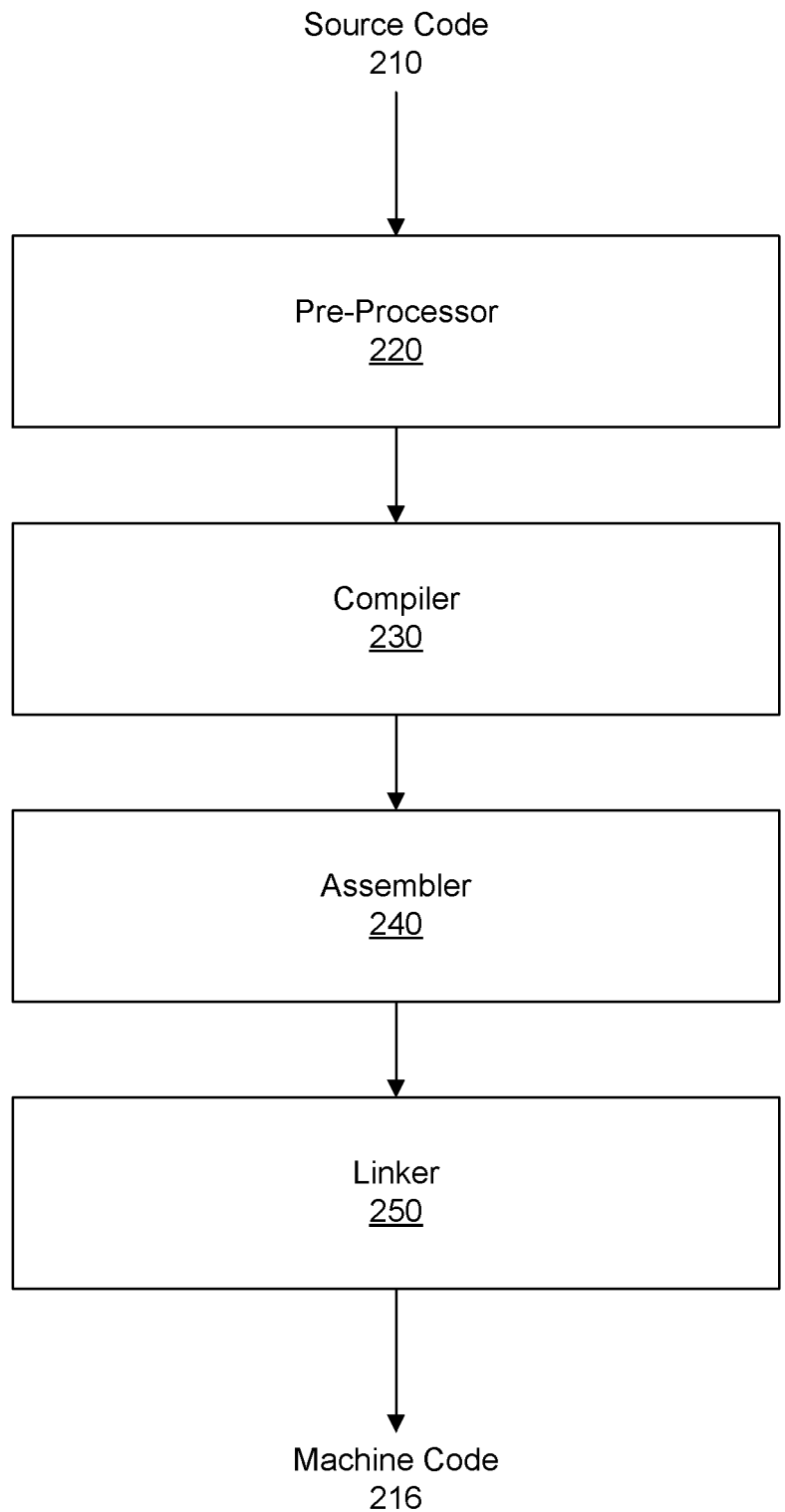
FIG. 2B illustrates a process for converting source code into machine code, in accordance with an embodiment.

FIG. 2B illustrates a process for converting source code 210 into machine code 216, in accordance with an embodiment. The process shown in FIG. 2B relates to a compiler 212 similar to the GNU C compiler (gcc) or GNU C++ compiler (g++), although other types of compilers and compiler architectures are contemplated as being within the scope of the present disclosure.

As shown in FIG. 2B, the source code 210 is processed by a pre-processor 220. The pre-processor 220 expands the source code 210 by, e.g., including header files, expanding macros, evaluating conditional statements for compiler directives, and manages line control (e.g., deleting empty lines and modifying white space between tokens). The output of the pre-processor 220 is in the same programming language of the source code 210. The compiler 230 compiles the output of the pre-processor to generate an IR or assembly code. The IR or assembly code is then processed by an assembler 240 to generate an object file. The object file is then linked with other object files and/or static libraries by the linker 250 to generate the binary executable machine code 216 for a particular target platform.

In an embodiment, the compiler 230 is configured to parse the text file produced by the pre-processor 220 to find tokens that match the suspend intrinsic function call, which define suspend points in a coroutine. The compiler 230 replaces this intrinsic function call with a set of IR or assembly instructions for implementing the suspend operation. These assembly instructions manage storing state information in a coroutine buffer (e.g., writing the value of live variables in the coroutine to the stack so that these variable values can be read when the coroutine resumes) as well as return values to the caller in accordance with the application binary interface (ABI). An example of a set of assembly instructions used to replace the suspend operation are given in Table 5.

TABLE 5

| | |
|---|---|
| . . . . | // Start of suspend epilogue |
| ST r10, CB[0] | // Store live value in coroutine buffer |
| ST r11, CB[4] | // Store next live value in coroutine buffer |
| MOV r0, #ret0 | // Store return value in ABI register |
| MOV r1, %L | // Store resume offset in next ABI register |
| SUB sp, sp, #frame_size | // Unwind stack frame via stack pointer decrement |
| RET | // Return back to caller |
| L: | // Resume here |
| ADD sp, sp, #frame_size | // Allocate stack frame via stack pointer increment |
| MOV r0, #param0 | // Read parameter into ABI register |
| LD r10, CB[0] | // Load live value from coroutine buffer |
| LD r11, CB[4] | // Load next live value from coroutine buffer |
| . . . | // End of suspend prologue |

In an embodiment, the compiler 230 implements an ABI including a coroutine epilogue and coroutine prologue which are similar to function prologues and function epilogues used for function call/returns. The coroutine epilogue is a set of assembly language instructions added immediately before the suspend point, and the coroutine prologue is a set of assembly language instructions added immediately after the suspend point. The coroutine epilogue can include instructions that store values to the coroutine buffer and the coroutine prologue can include instructions that read values from the coroutine buffer. In other words, the intrinsic function for the suspend operation is associated with an ABI call that causes local resources in the coroutine that are live across the suspend point to be stored in a coroutine buffer. The coroutine buffer is stored in one of a local stack memory or a heap memory.

In an embodiment, the suspend/resume mechanism utilizes the ABI for callee to caller communication (e.g., on suspend) and for caller to callee communication (e.g., on resume). A suspend operation is similar to a function return in the ABI, which is a location in execution of the coroutine where execution of the coroutine is suspended and a number of return values are passed form the coroutine to the caller. The values returned as part of the suspend operation are stored in the coroutine buffer (e.g., in the stack memory or heap memory). A resume operation is similar to a function entry in the ABI, which is a location in the coroutine where execution begins or resumes and parameters are passed from the caller to the coroutine. The resume operation loads parameter values from the coroutine buffer.

In an embodiment, the suspend point instructions cause the processor to return the offset location corresponding to the suspend point, return data values (e.g., one or more values) of the coroutine, spill scratch registers, restore preserved registers, suspend execution back to the caller, save preserved registers, and/or refill scratch registers. As used herein, scratch registers refer to temporary registers used to store intermediate values in the scope of the coroutine. Spilling scratch registers refers to storing the values of scratch registers into the stack memory, and refilling scratch registers refers to loading values from the stack memory into the scratch registers. It will be appreciated that any intermediate values stored in the scratch registers that are live across the suspend point need to be preserved so that these values are available after resume, even if these registers are reused by, e.g., the caller function between the suspend operation and the resume operation.

In an embodiment, the compiler 230 is further configured to detect an intrinsic function for a destroy operation in the source code that causes the processor to deallocate the coroutine buffer for the coroutine. In an embodiment, the destroy operation can be related to a return intrinsic function for a coroutine. Unlike a return intrinsic for a function, a return intrinsic for a coroutine inserts assembly language instructions that cause the processor to deallocate a portion of the stack memory allocated to the coroutine buffer. In another embodiment, a separate and distinct destroy intrinsic function can be defined that can be called in a coroutine immediately before a final return call that represents the termination of the coroutine and not merely a suspend point. This embodiment would potentially require the programmer to remember to deallocate the coroutine buffer and, if omitted from the source code, could potentially lead to issues in execution of the stack memory. Thus, a preferred embodiment may be to include the destroy operation functionality in the return intrinsic for a coroutine, which is separate and distinct from the return intrinsic for a function. The compiler then needs determine whether the return intrinsic is inside a coroutine or a function to choose what set of assembly instructions to insert in the code.

In an embodiment, definitions for the intrinsic functions for coroutines can be included in a header file, which can be included in any source code that utilizes the described coroutine functionality. The header file can be included using a compiler directive in the source code in order to call these intrinsic functions in the source code for a coroutine.

Figure 3:
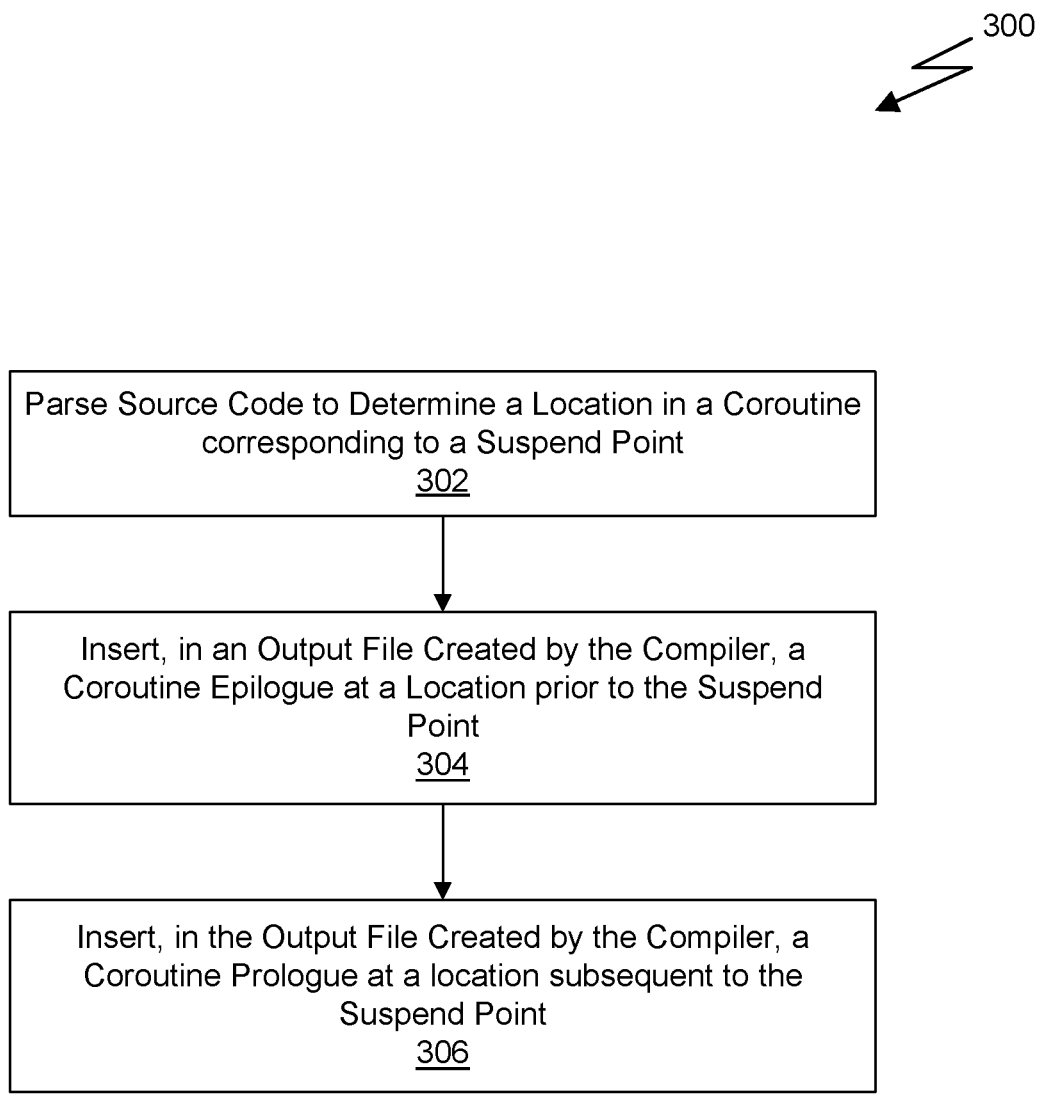
FIG. 3 illustrates a flowchart of a method for compiling a suspend intrinsic in the source code, in accordance with an embodiment.

FIG. 3 illustrates a flowchart of a method 300 for compiling a suspend intrinsic in the source code, in accordance with an embodiment. Each block of method 300, described herein, comprises a computing process that may be performed using any combination of hardware, firmware, and/or software. The method may also be embodied as computer-usable instructions stored on computer storage media. In an embodiment, the method may be implemented by a compiler. In addition, method 300 is described, by way of example, with respect to the system of FIG. 2A.

At step 302, a compiler 230 parses source code to determine a location in a coroutine corresponding to a suspend point. In an embodiment, the source code is a text or character file containing code in a high-level programming language. The text file can include tokens that include variables, functions, compiler directives, intrinsic functions, and the like. Tokens can be separated by line, white space, or characters such as brackets, parentheses, punctuation, and the like in accordance with a semantics of the programming language. In an embodiment, the compiler 230 is configured to read the source code file and, line by line, interpret the tokens and/or characters included in the source code file in accordance with a semantics of the programming language.

In response to the compiler 230 detecting a token that is associated with a suspend point, such as a series of characters that represent an intrinsic function name for a suspend operation, the compiler 230 is configured to add a number of instructions in an assembly language to an output file generated by the compiler. The number of instructions may be configured based on the parameters passed in the intrinsic function call contained in the source code file.

At step 304, the compiler 230 inserts a coroutine epilogue, at a location in an output file created by the compiler 230 prior to the suspend point. As used herein, the suspend point refers to a line in the source code, located inside the coroutine, that includes an intrinsic function call for a suspend operation. The line in the source code is expanded into multiple lines of assembly code in the output file (e.g., the machine code file) generated or created by the compiler 230. The suspend point may correspond to a line in the machine code that returns execution to the caller of the coroutine. Prior to the suspend point, one or more additional lines of assembly code may be added (i.e., inserted) to the output file in order to manage, among other functions, spilling registers to the stack memory that must be preserved when the coroutine resumes operation. The one or more additional lines of assembly code prior to the suspend point can be referred to as the coroutine epilogue.

At step 306, the compiler 230 inserts a coroutine prologue, at a location in the output file created by the compiler 230 subsequent to the suspend point. Subsequent to the suspend point, one or more additional lines of assembly code may be added (i.e., inserted) to the output file in order to manage, among other functions, refilling registers from the stack memory with values that were preserved via execution of the lines of assembly code in the coroutine epilogue. The one or more additional lines of assembly code after the suspend point can be referred to as the coroutine prologue.

It will be appreciated that the functionality of the compiler described above can be executed on a host processor such as processor 202. However, the machine code 216 generated by the compiler 212 can be compiled for the same type of processor (i.e., processor architecture) or a different type of processor, such as a graphics processing unit (GPU) or other type of parallel processing unit (PPU). An example of one exemplary architecture in which coroutines may be implemented for multiple threads in parallel is set forth below.

Parallel Processing Architecture

Figure 4:
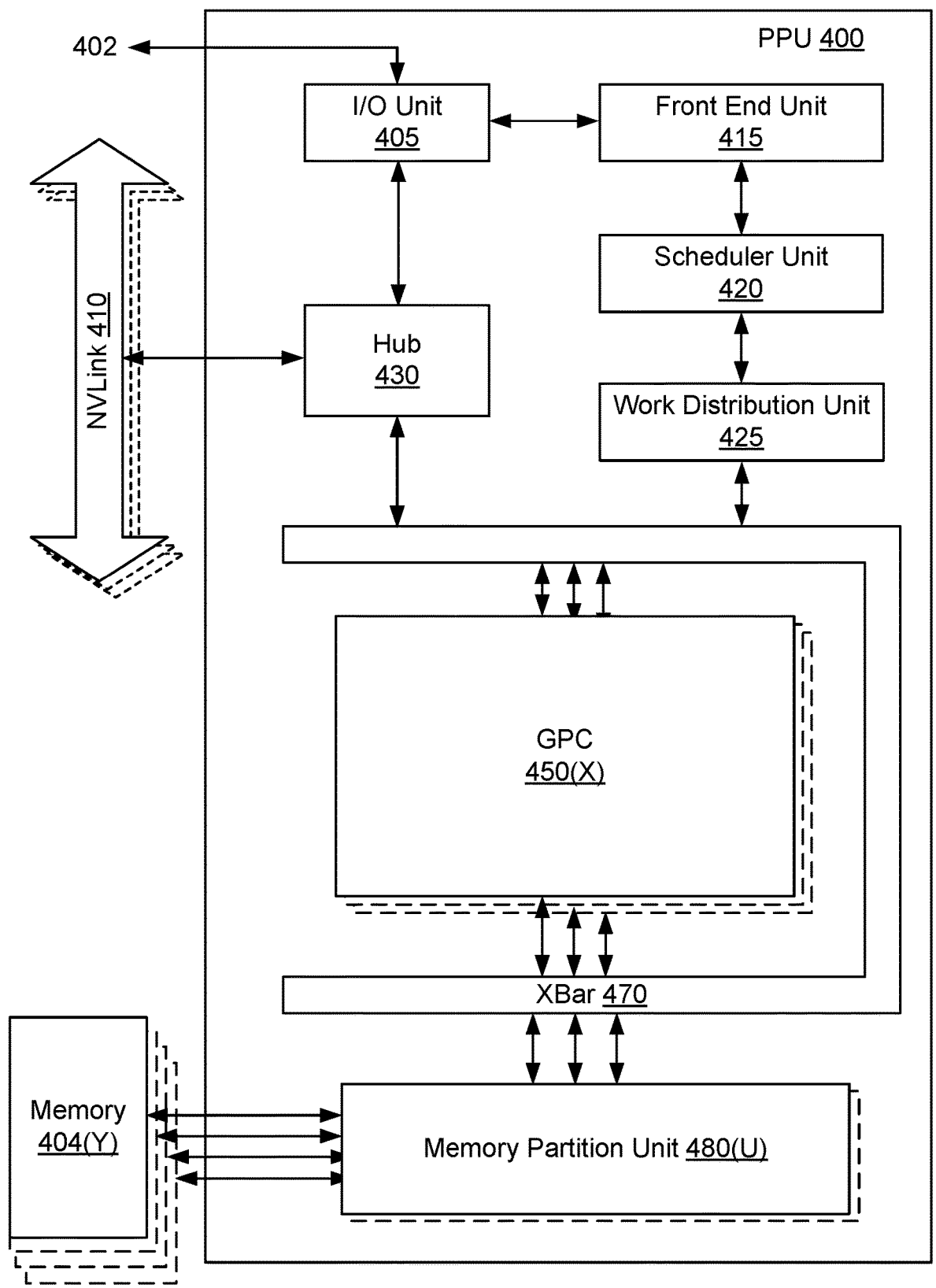
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to execute the coroutine implemented in the machine code generated in method 100. The PPU 400 may also be included in system 200.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L cache. The texture units implement texture operations such as filtering operations using mip-maps (e.g., texture maps of varying levels of detail). In an embodiment, each processing unit includes two texture units.

Each processing unit also comprises Nload store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
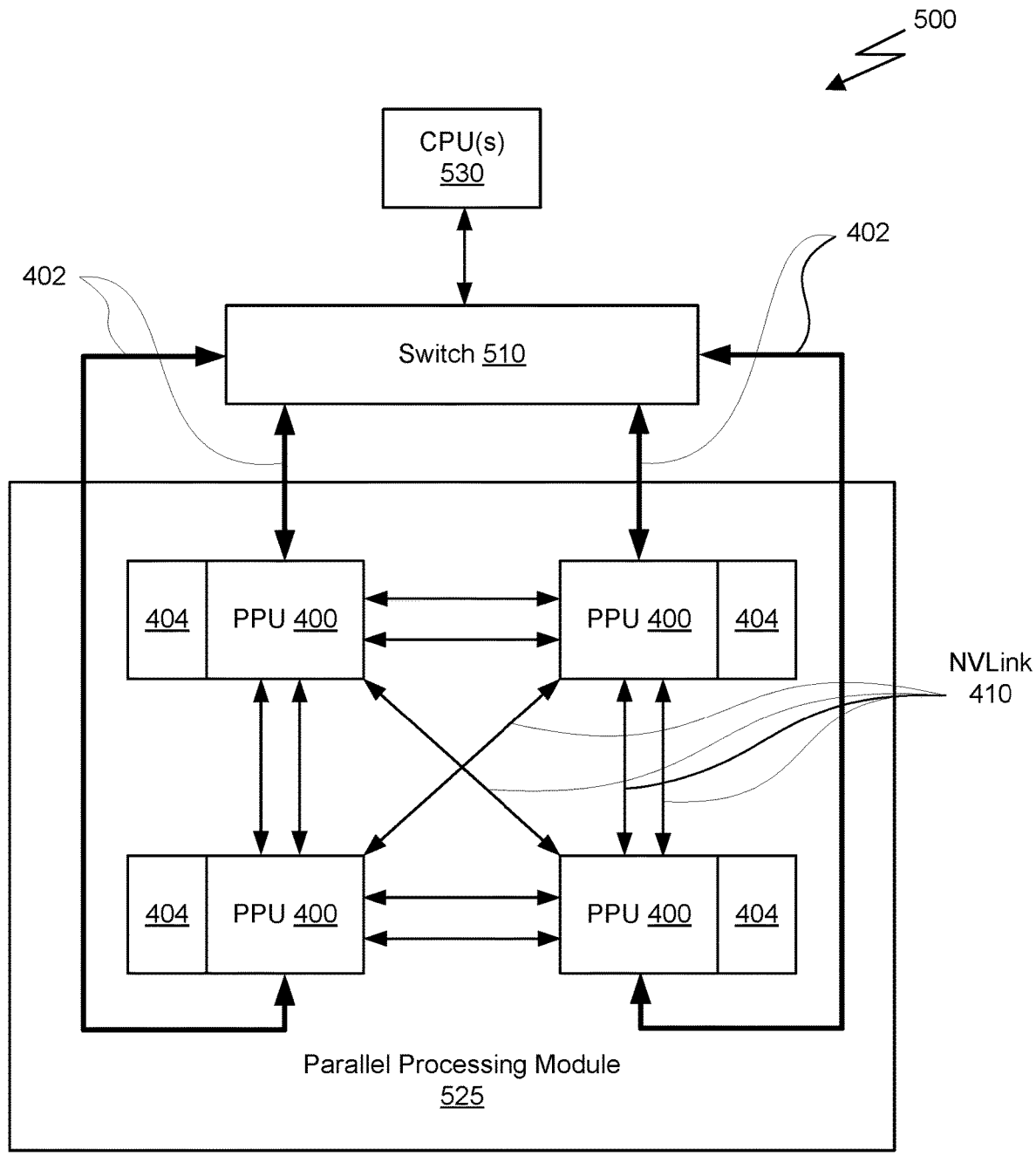
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 100 shown in FIG. 1. The processing system 500 includes a CPU 530, switch 510, and multiple PPUs 400, and respective memories 404.

Figure 5B:
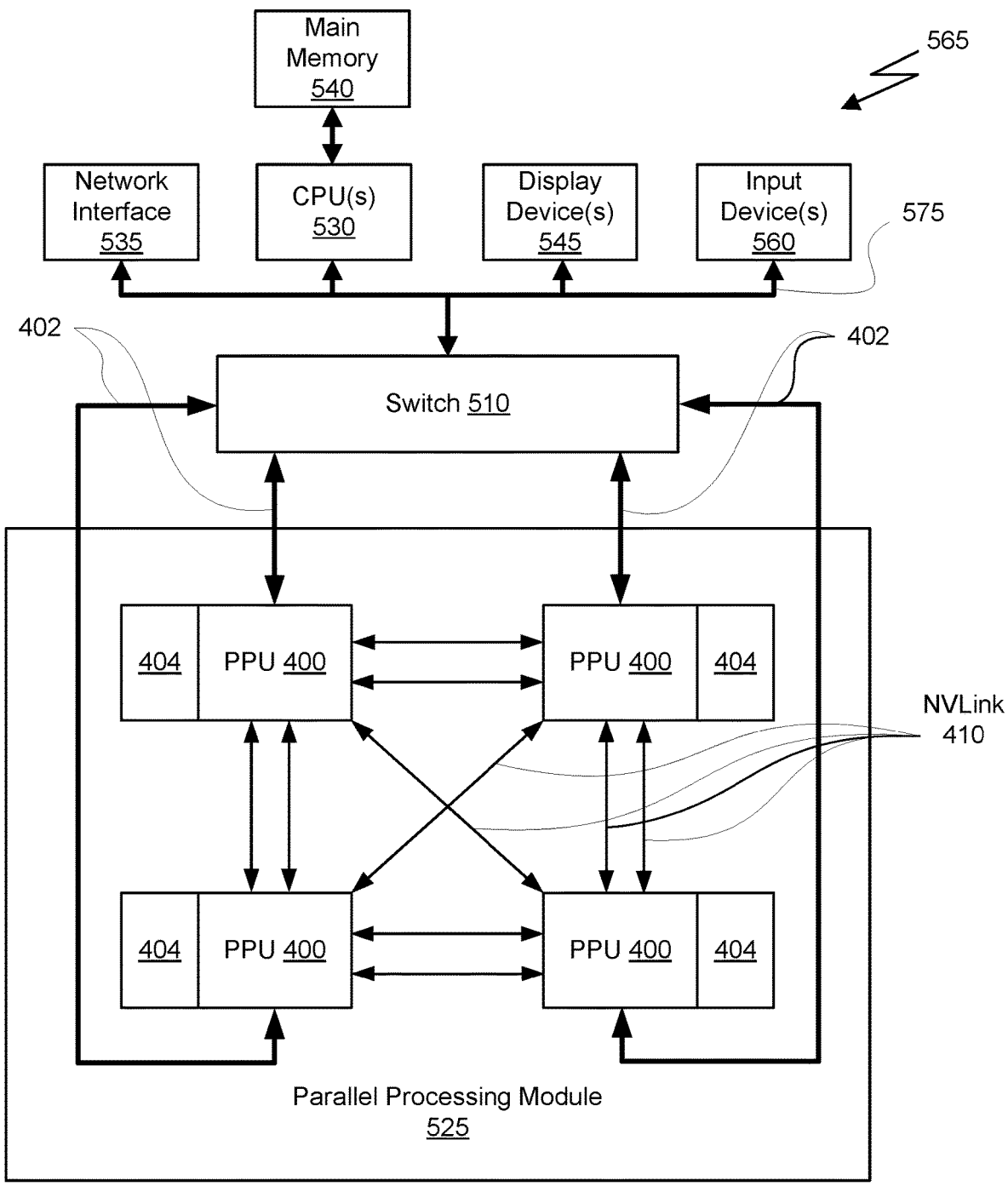
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
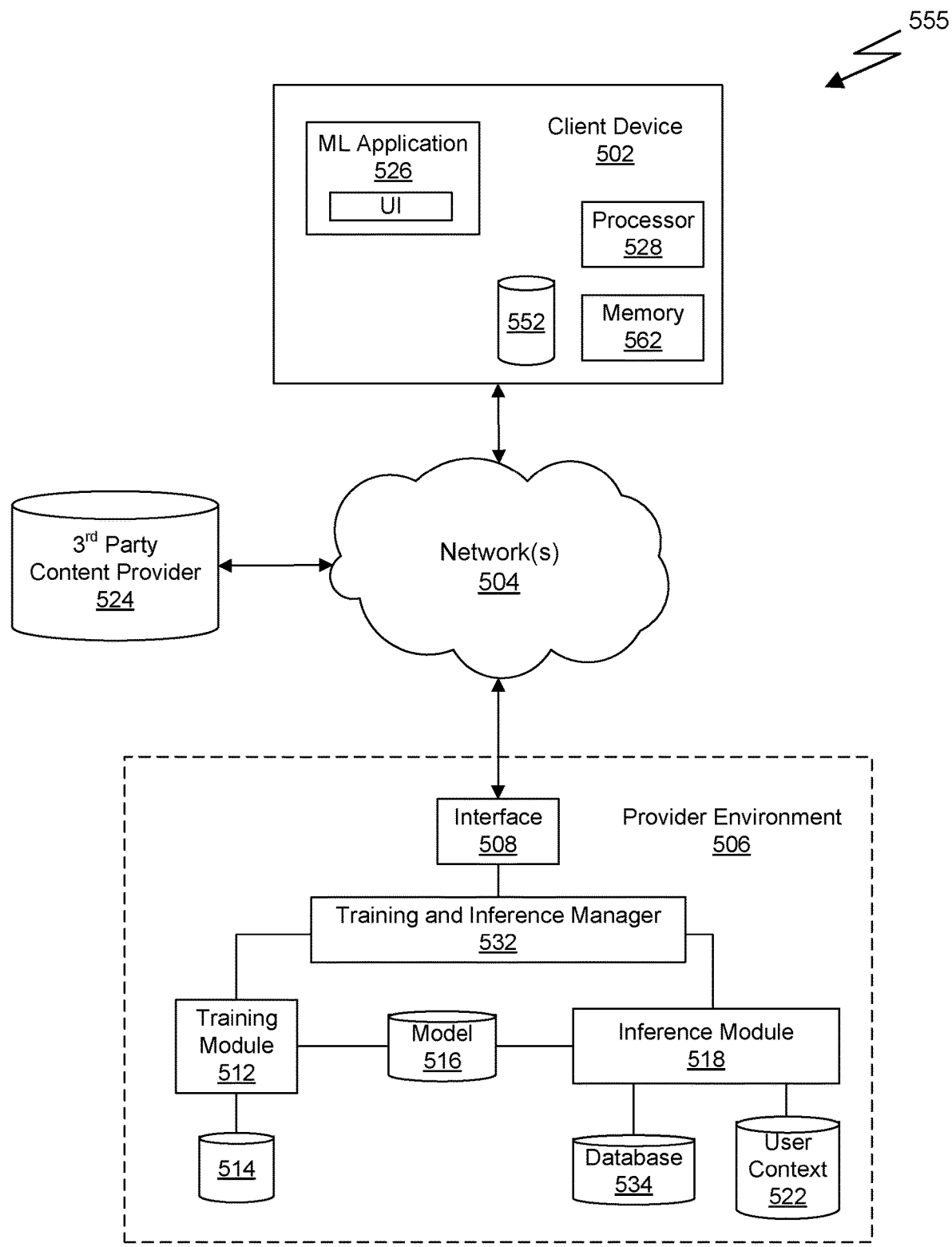
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (UD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Example Game Streaming System

Figure 6:
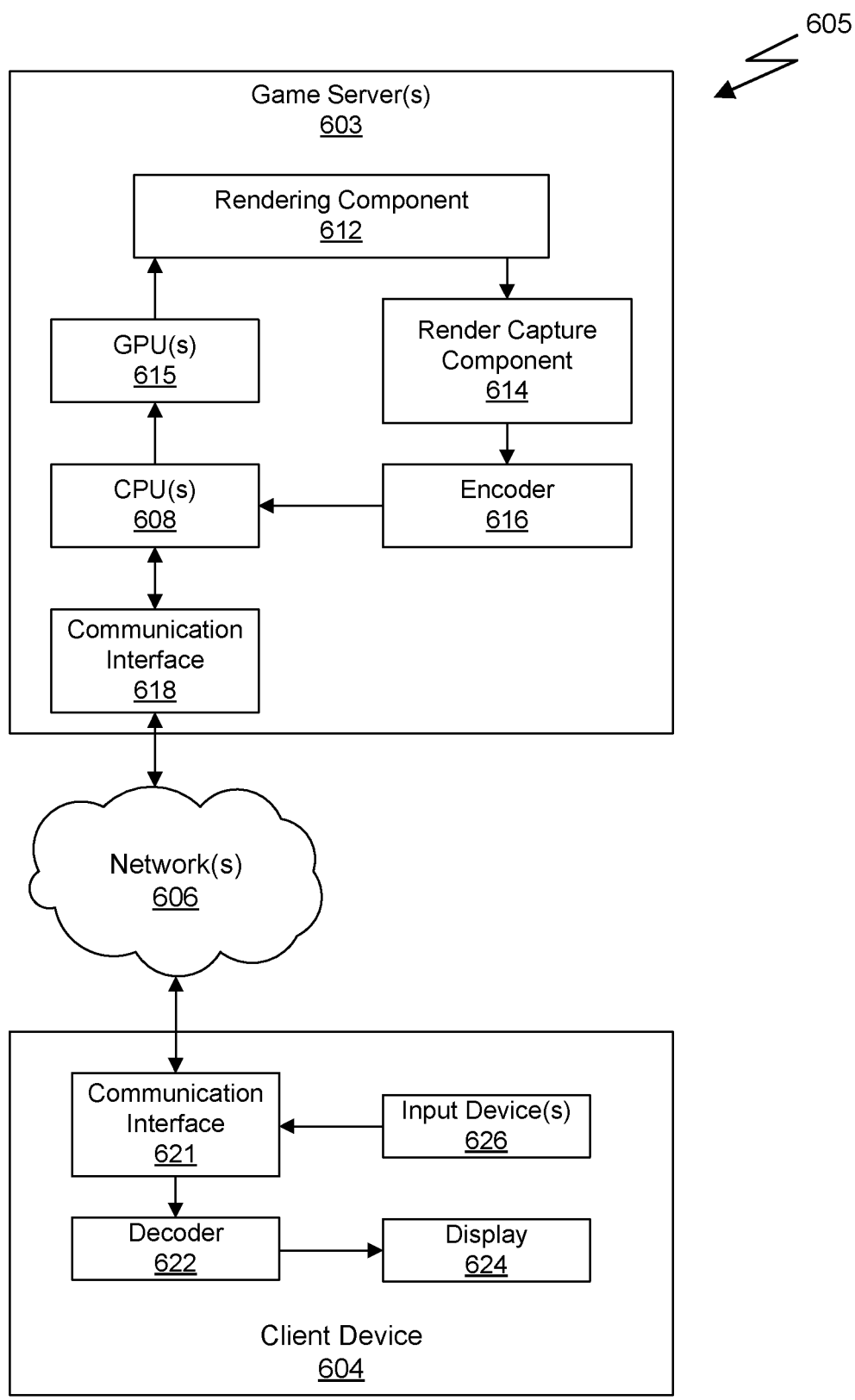
FIG. 6 illustrates an exemplary game streaming system suitable for use in implementing some embodiments of the present disclosure.

FIG. 6 is an example system diagram for a game streaming system 605, in accordance with some embodiments of the present disclosure. FIG. 6 includes game server(s) 603

(which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
receiving source code for a program in a high-level programming language, wherein the source code includes a caller and a coroutine called by the caller; and
compiling the source code with a compiler to generate machine code for a target processor, wherein the compiler is configured to detect an intrinsic function for a suspend operation in the source code for the coroutine,
wherein the intrinsic function for the suspend operation includes at least two parameters that include an offset value and a return value, and
wherein the caller includes a resume operation that calls the coroutine at an offset location specified by a typecast of a function pointer for the coroutine added to the offset value.

2. The computer-implemented method of claim 1, wherein the intrinsic function for the suspend operation is associated with an application binary interface that causes local resources in the coroutine to be stored in a coroutine buffer.

3. The computer-implemented method of claim 2, wherein the coroutine buffer is stored in one of a local stack memory or a heap memory.

4. The computer-implemented method of claim 2, wherein the compiler is further configured to detect an intrinsic function for a destroy operation in the source code that causes the target processor to deallocate the coroutine buffer for the coroutine.

5. The computer-implemented method of claim 1, further comprising:
executing, by the target processor, the machine code such that the coroutine is suspended from a first suspend point and resumed at the first suspend point.

6. A computer system, comprising:
a memory storing a compiler and a source code for a program in a high-level programming language, wherein the source code includes a caller and a coroutine called by the caller; and
a processor configured to execute the compiler to generate machine code for a target processor, wherein the compiler is configured to detect an intrinsic function for a suspend operation in the source code for the coroutine,
wherein the intrinsic function for the suspend operation includes at least two parameters that include an offset value and a return value, and
wherein the caller includes a resume operation that calls the coroutine at an offset location specified by a typecast of a function pointer for the coroutine added to the offset value.

7. The computer system of claim 6, wherein the intrinsic function for the suspend operation is associated with an application binary interface that causes local resources in the coroutine to be stored in a coroutine buffer.

8. The computer system of claim 7, wherein the coroutine buffer is stored in one of a local stack memory or a heap memory.

9. The computer system of claim 7, wherein the compiler is further configured to detect an intrinsic function for a destroy operation in the source code that causes the target processor to deallocate the coroutine buffer for the coroutine.

10. The computer system of claim 6, wherein the target processor is further configured to execute the machine code such that the coroutine is suspended from a first suspend point and resumed at the first suspend point.

11. The computer system of claim 6, further comprising a parallel processing unit communicatively coupled to the processor and/or the memory.

12. The computer system of claim 11, wherein the parallel processing unit is the target processor and configured to execute the machine code such that the coroutine is suspended from a first suspend point and resumed at the first suspend point.

13. A non-transitory computer-readable medium storing instructions that, responsive to being executed by a processor, configure the processor to:
receive source code for a program in a high-level programming language, wherein the source code includes a caller and a coroutine called by the caller; and
compile the source code with a compiler to generate machine code for a target processor, wherein the compiler is configured to detect an intrinsic function for a suspend operation in the source code for the coroutine,
wherein the intrinsic function for the suspend operation includes at least two parameters that include an offset value and a return value, and
wherein the caller includes a resume operation that calls the coroutine at an offset location specified by a typecast of a function pointer for the coroutine added to the offset value.

14. The non-transitory computer-readable medium of claim 13, wherein the target processor is further configured to execute the machine code such that the coroutine is suspended from a first suspend point and resumed at the first suspend point.

15. The non-transitory computer-readable medium of claim 13, wherein the intrinsic function for the suspend operation is associated with an application binary interface that causes local resources in the coroutine to be stored in a coroutine buffer.

16. The non-transitory computer-readable medium of claim 15, wherein the coroutine buffer is stored in one of a local stack memory or a heap memory.

17. The non-transitory computer-readable medium of claim 15, wherein the compiler is further configured to detect an intrinsic function for a destroy operation in the source code that causes the target processor to deallocate the coroutine buffer for the coroutine.

* * * * *